No. 861,545. PATENTED JULY 30, 1907.
F. H. SMITH.
LAWN HOSE SUPPORT.
APPLICATION FILED AUG. 20, 1906.

Witnesses
Inventor
Frank H. Smith
By Hazard & Harpham
Attorneys.

UNITED STATES PATENT OFFICE.

FRANK H. SMITH, OF LOS ANGELES, CALIFORNIA, ASSIGNOR TO GEORGE S. BATTY, OF LOS ANGELES, CALIFORNIA.

LAWN-HOSE SUPPORT.

No. 861,545.   Specification of Letters Patent.   Patented July 30, 1907.

Application filed August 20, 1906. Serial No. 331,386.

*To all whom it may concern:*

Be it known that I, FRANK H. SMITH, a citizen of the United States, residing at Los Angeles, in the county of Los Angeles and State of California, have invented new and useful Improvements in Lawn-Hose Supports, of which the following is a specification.

My invention relates to a stand or support for holding the pipe and nozzle of a lawn hose when the supporter is to remain in one location for a considerable length of time, but can be changed to discharge water in different directions from the support without taking up the support.

A further object is to provide a device by means of which the nozzle can be instantly secured thereto or removed therefrom and which can be adjusted to any form or size of nozzle.

I accomplish these objects by means of the device described herein and illustrated in the accompanying drawings in which:—

Figure 1:
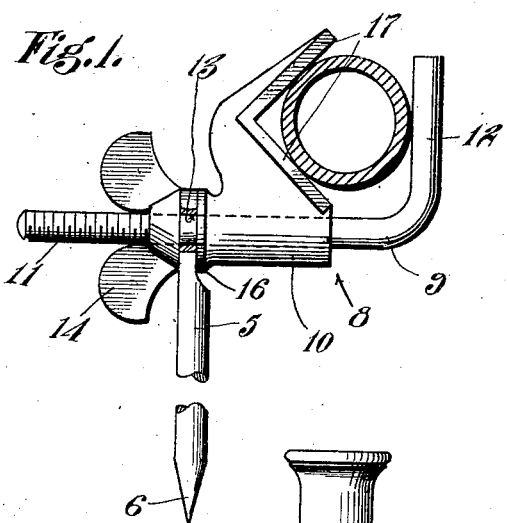
Figure 2:
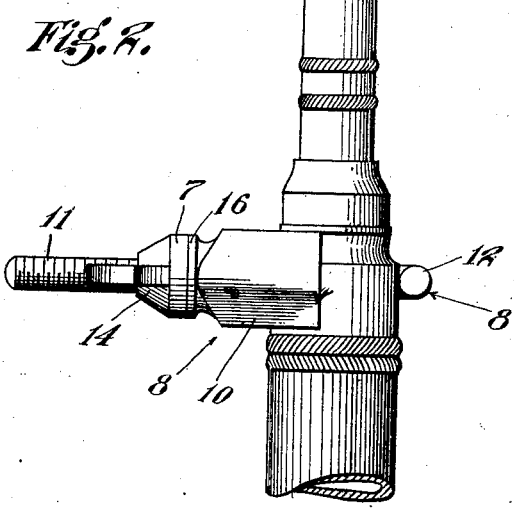

Figure 1.—is an elevation of my improved support with the nozzle in place therein. Fig. 2.—is a plan of my improved support with the nozzle in place therein.

Referring to the drawings 5 is a metal support or rod pointed on one end as at 6 so that it may be easily forced into the ground, and also to permit of its being turned in any desired direction while the hose is in operation. The upper portion of this support is preferably flattened as at 7 to form a bearing for the sliding member of the clamp 8. This clamp is preferably composed of two members, a swivel member 9 and a sliding member 10. The swivel member is preferably formed of a rod threaded on one end as at 11 and having its other end bent at right angles to the threaded end to form a jaw 12. The threaded end of member 9 passes through an aperture 13 formed in the flattened portion of the rod 5, and is provided with a winged nut 14. Slidably mounted on the swiveled clamp member 9 is a sliding member 10 formed with a shoulder 16 which is adapted to bear against the flattened portion of the rod 5. This sliding member is provided with a V-shaped jaw 17 which together with the jaw 12 formed on the swivel member serves to firmly hold the nozzle of the hose in place therein.

After the nozzle has been clamped between these jaws and it is found desirable to alter the angle of the nozzle it can readily be accomplished by slightly loosening the winged thumb nut 14 and re-adjusting the nozzle to a different inclination, when the thumb nut can then be tightened to retain it in its new position.

It will be observed by the above description that my support can be adjusted to accommodate itself to any form or size of nozzle and that by simply slightly loosening the winged thumb nut the jaw 12 of the swiveled member 9 can be turned out of engagement with the nozzle.

Having described my invention what I claim as new and desire to secure by Letters Patent is:—

1. In a device of the class described, a support; a clamp, comprising a swivel member formed of a bolt screw threaded on one end and having the other end bent at right angles to the body, and a member having a V shaped notch therein loosely mounted on said swivel member; and means for frictionally securing the clamp on both the hose and the support.

2. In a device of the class described, a support; a clamp, comprising a swivel member formed of a bolt having one end bent at an angle thereto, and a member having a V-shaped notch therein loosely mounted on said swivel member; and means for frictionally securing the clamp on both the hose and the support.

In witness that I claim the foregoing I have hereunto subscribed my name this 11th day of August, 1906.

FRANK H. SMITH.

Witnesses:
 EDMUND A. STRAUSE,
 B. M. WILKINSON.